United States Patent [19]

Wrench, Jr. et al.

[11] Patent Number: 5,036,539
[45] Date of Patent: Jul. 30, 1991

[54] REAL-TIME SPEECH PROCESSING DEVELOPMENT SYSTEM

[75] Inventors: Edwin H. Wrench, Jr.; Alan L. Higgins, both of San Diego, Calif.

[73] Assignee: ITT Corporation, New York, N.Y.

[21] Appl. No.: 376,076

[22] Filed: Jul. 6, 1989

[51] Int. Cl.$^5$ ............................ G10L 7/08; G10L 7/02
[52] U.S. Cl. ........................................ 381/43; 381/41
[58] Field of Search .................................. 381/41–46; 364/513.5

[56] References Cited

U.S. PATENT DOCUMENTS

| | | | |
|---|---|---|---|
| 4,144,582 | 3/1979 | Hyatt | 381/43 |
| 4,641,238 | 2/1987 | Kneib | 364/200 |
| 4,653,097 | 3/1987 | Watanabe et al. | 381/42 |
| 4,695,977 | 9/1987 | Hansen et al. | 364/900 |
| 4,799,144 | 1/1989 | Parruck et al. | 364/200 |
| 4,827,522 | 5/1989 | Matsuura et al. | 381/43 |

OTHER PUBLICATIONS

Perdue et al., AT&T Technical Journal, *Conversant 1 Voice System: Architecture and Applications*, Sep./Oct. 1986, vol. 65, No. 5; pp. 34–47.

*Primary Examiner*—Gary V. Harkcom
*Assistant Examiner*—Michelle Doerrler
*Attorney, Agent, or Firm*—Arthur L. Plevy

[57] ABSTRACT

A real-time speech processing development system has a control subsystem (CS) and a recognition subsystem (RS) interconnected by a CS/RS interface. The control subsystem includes a control processor, an operator interface, a user interface, and a control program module for loading any one of a plurality of control programs which employ speech recognition processes. The recognition system RS includes a master processor, speech signal processor, and template matching processors all interconnected on a common bus which communicates with the control subsystem through the mediation of the CS/RS interface. The two-part configuration allows the control subsystem to be accessed by the operator for non-real-time system functions, and the recognition subsystem to be accessed by the user for real-time speech processing functions. An embodiment of a speaker verification system includes template enrollment, template training, recognition by template-concatenation and time alignment, silence and filler template generation, and speaker monitoring modes.

11 Claims, 5 Drawing Sheets

REAL-TIME SPEECH PROCESSING DEVELOPMENT SYSTEM

FIELD OF INVENTION

The present invention relates to a computerized system for performing speaker verification, speech recognition, and other speech processing functions, and particularly, to one which can be efficiently used for both system development operations and real-time speech processing operations.

BACKGROUND OF INVENTION

Conventional speech processing systems commonly employ a speech recognition module which transforms input signals representing speech utterances into discrete representations that are compared to stored digital representations (templates) of expected words or speech sound units. The input speech signals are "recognized" usually by using a statistical algorithm to measure and detect a match to a corresponding word or sound template. Speech processing systems and algorithms are usually designed for one or more particular modes of operation, e.g., speaker-dependent or independent speech recognition, text- or application-dependent or independent speech recognition, speaker verification (authentication of identity), speaker recognition (selection from a number of candidates), or speaker monitoring (identity, direction, etc.). The design of such systems can vary widely with the application, speaker vocabulary, syntax, or environment of use.

Over the past several years, speech processing technology has achieved a level of performance sufficient to admit the introduction of successful commercial products. Development work continues to further improve the accuracy, reduce the vulnerability, and expand the capabilities of such systems. However, progress toward improvement has been limited by the available tools for system and algorithm development.

One factor limiting progress is that error rates have become low enough, for example, in text-dependent speaker verification, that a large test must be performed to ascertain whether an improvement has been made. To illustrate, if the probability of false acceptance is on the order of 1/1000, and the test is designed to observe 30 errors, then 30,000 trials are needed. Performing such a test using a simulation running on a time-sharing computer could take weeks or months. To mitigate this problem, tests may be run using a fast special-purpose hardware implementation of the recognition algorithm. However, this leads to a second problem, i.e. making changes to the algorithm may be very difficult because of the constraints imposed by the hardware or software.

A third important factor is that the recognition system itself influences the user's speaking behavior. This influence is absent if the user's speech input is prerecorded and the user does not have a real-time interaction with the system. The environment in which the system is installed, the details of the user interface, and the feedback of past acceptance or rejection decisions can all affect the user's interaction with the system. Thus, valid testing in the intended environment of use requires a real-time implementation of the recognition algorithm and an accurate simulation of the user interface.

SUMMARY OF INVENTION

In order to improve upon the utility and effectiveness of conventional speech processing systems, it is a principal object of the invention that the system be operable in real-time response to speaker input using a realistic user interface, while at the same time remain flexible and accessible enough to be a useful tool for the development and improvement of speech recognition algorithms and system designs. A particular object of the invention is to provide a speech processing development system which allows non-real-time access to its command, control, and recognition structures so that changes can be made readily to the system design and/or recognition algorithm, and which simultaneously allows real-time interaction of a speaker with its speech recognition functions.

In accordance with the invention, a real-time speech processing development system comprises:

(a) a speech recognition subsystem including a master processor, a template matching processor, a speech signal processor, and speech signal input means, wherein said master processor is configured to receive internal subsystem operation commands for performing speech recognition and to thereupon generate subsystem execution commands for real-time operation of said speech signal processor to process speech signals received from a user through said speech signal input means into corresponding digital representations, and of said template matching processor to compare the digital representations provided by said speech signal processor with stored templates of word or sound units and to produce a real-time speech recognition output based thereon;

(b) a control subsystem including an operator interface for control communications with a system operator, a user interface for control communications with a user, a control program module, and a control processor connected to said operator interface, said speaker interface, and said control program module, wherein said control processor is configured to receive operator control input through said operator interface and to access said control program module to load one of plurality of control programs selected by the operator, including a speech recognition control program, and wherein said control processor is further configured to operate said user interface, when the speech recognition control program is selected by the operator, for control communications with the user, and to execute said speech recognition control program so as to generate the internal subsystem operation commands for performing speech recognition provided to said master processor of said recognition subsystem; and (c) an interface connected between said control subsystem and said recognition system for transmitting the internal subsystem operation commands for performing speech recognition from said control subsystem to said recognition subsystem and the real-time speech recognition output from said recognition subsystem to said control subsystem, whereby said control subsystem can be accessed by the operator for non-real-time system development functions while said recognition subsystem can be accessed by the user for real-time speech recognition functions.

In the preferred embodiment of the invention, the control program module of the control subsystem includes control programs for a speaker enrollment program for enrolling speech or vocabulary samples of a speaker into the system, a speaker verification program for verifying a speaker based upon comparisons to stored speech samples of the speaker, and a speaker monitoring program for passively monitoring the identity of a speaker. The three control programs of the system each includes use of the core speech recognition program.

BRIEF DESCRIPTION OF DRAWINGS

The above objects and further features and advantages of the invention are described in detail below in conjunction with the drawings, of which.

DETAILED DESCRIPTION OF INVENTION

The present invention encompasses speech processing systems for a wide range of speech processing functions and modes of operation, including speaker-dependent or independent speech recognition, text- or application-dependent or independent speech recognition, speaker verification, speaker recognition, speaker monitoring, continuous speech recognition, wordspotting, and isolated word recognition, as well as for different environments of use and field applications. The preferred embodiment of the invention described herein is directed to a system for speaker verification using a speaker-dependent, template-matching recognition algorithm. However, it is to be understood that the principles of the invention are equally applicable to other types of systems and are not limited to the described system.

For a wider, more detailed explanation of speech recognition systems, the following are incorporated herein by reference: "A Comparison of Four Techniques for Automatic Speaker Recognition", by R. E. Wohlford, E. H. Wrench, and B. P. Landell, 1980 IEEE International Conference on Acoustics, Speech and Signal Processing (ICASSP), vol. 3, pp. 908-911; "A Realtime Implementation of a Text Independent Speaker Recognition System", by E. H. Wrench, 1981 ICASSP, vol. 1, pp. 193-196; "Keyword Recognition Using Template Concatenation", by A. L. Higgins and R. E. Wohlford, 1985 ICASSP; "Speaker Recognition by Template Matching", by A. L. Higgins, Proceedings of Speech Technology 1986, New York, N.Y.; "Improved Speech Recognition in Noise", by B. P. Landell, R. E. Wohlford, and L. G. Bahler, 1986 ICASSP, vol. 1, no.1; U.S. Pat. No. 4,720,863 issued Jan. 19, 1988, to K. P. Li and E. H. Wrench; and copending U.S. patent application No. 346,054, filed on 5/2/89, by B. P. Landell et al., entitled "Automatic Speech Recognition System Using Seed Templates", now U.S. Pat. No. 4,994,983.

Figure 1:
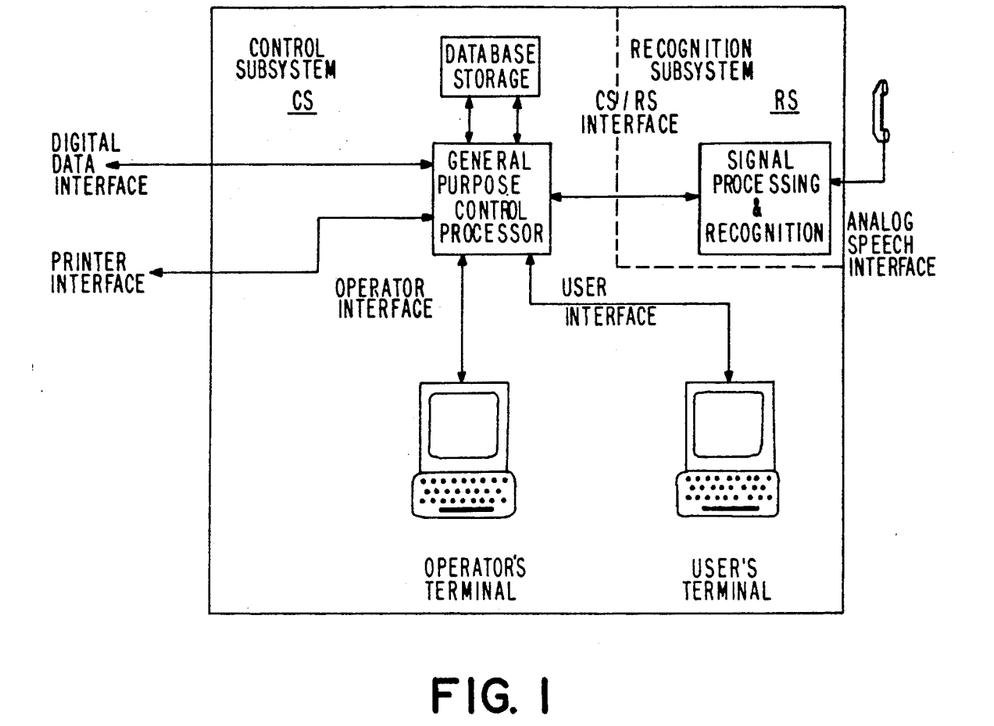
FIG. 1 is a schematic diagram of the external configuration of a real-time speech processing development system in accordance with the invention.

Referring to FIG. 1, a real-time speech processing development system in accordance with the invention has a control subsystem CS and a recognition subsystem RS interconnected by a CS/RS interface. The control subsystem CS includes a general purpose control processor, an operator interface to an operator's terminal, a user interface to a user's terminal, a database storage, and input/output interfaces to system peripherals such as a printer, modem, datalink, etc. The recognition system RS includes a signal processing and recognition module which receives analog speech signal input from an input device (microphone set) for the user.

Figure 2:
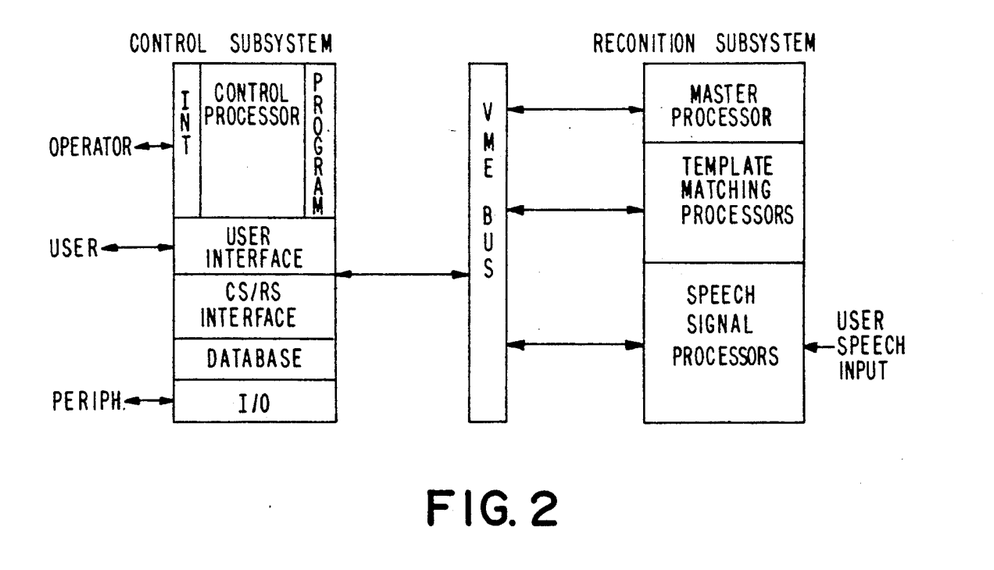
FIG. 2 is a schematic diagram of the internal configuration of a control subsystem and a recognition subsystem for the real-time speech processing development system of the invention.

As shown in FIG. 2, the internal structure of the control subsystem CS includes the general purpose control processor which is interconnected for external communication with the operator through the operator interface and with the user through the user interface, the CS/RS interface to the common bus for internal communication with the recognition subsystem RS, the database storage, and the digital data input/output interface. The control processor is connected to a control program module, to be described further below.

The control processor is configured to receive operator control input through the operator interface and to access the control program module to load one of a plurality of control programs selected by the operator. The control program is executed by the control processor to control communications with the operator and/or user, and to generate internal subsystem operation commands which are provided through the CS/RS interface to the master processor of the recognition subsystem RS via a common bus. The database storage is used to store the system data files, the user data files, and the template files.

The internal structure of the recognition subsystem RS includes a master processor, a plurality of template matching processors in parallel, and a speech signal processor which is connected to the speech signal input device. The master processor, template processors, and speech signal processor are all interconnected with the common bus. The master processor is configured to receive the internal subsystem operation commands for performing speech recognition sent from the control subsystem CS via the common bus, and to thereupon generate subsystem execution commands. The RS execution commands activate RS program modules (to be described hereinafter) for real-time operation of the speech signal processor to process input speech signals into corresponding digital representations, and of the template matching processors to compare the digital representations provided by the speech signal processor with templates of word or sound units and to produce a real-time speech recognition output based thereon.

The common bus connects the control subsystem and the recognition system through the mediation of the CS/RS interface to transmit the internal subsystem operation commands from the control subsystem CS to the recognition subsystem RS and the real-time outputs and responses from the recognition subsystem to the control subsystem. The two-subsystem configuration allows the control subsystem to be accessed by the operator for non-real-time system functions, such as handling the user interface, program decision-making, program editing, database management, and system initialization, testing and diagnostics. This frees the recognition subsystem to be accessed by the user for real-time speech functions, such as speech signal digitization, spectral frame analysis, and template matching.

In a practical implementation, the control subsystem hardware is a Sun 3/160 Unix workstation which includes a 16 MHz Motorola 68020 CPU with 8 megabytes of CPU memory and 160 megabytes of disk storage. A System Administrator CRT console is used as the operator's console, and a VT-100 type terminal as the user's terminal. The recognition subsystem is composed of an ICS-100 4-channel A/D and D/A converter, a 400 KHz maximum sampling rate, and 4 255-tap programmable digital FIR filters for signal acquisition and conditioning; a Sky Challenger board containing two TMS-32020s at 20 MHz clock rate to perform front end signal processing of real-time parameter values of the input speech signals into frames of speech data; and seven Motorola 68020-based single-board processors, one of which is used to serve as the master processor, and the other six to perform template matching. Each 68020 board contains 1 megabyte of random access memory and operates at a 20 MHz clock rate.

All of the above devices are commercially available VME-compatible boards that plug directly into the Sun 3/160 VME backplane. The VME bus serves as the medium of communication between the two subsystems. The throughput of the system is approximately 3000 template frames per input frame. A microphone preamplifier and a digital sampling clock are implemented on a custom wire wrap board mounted with the ICS-100 A/D converter. The entire system is contained within the chassis of the Sun workstation. A telephone style handset is plugged into a connector located on the rear of the unit.

A database management system (DBMS) is provided with the control subsystem to manage the data storage and retrieval operations. In the speaker verification operational mode of the system, for example, three databases are maintained: a user database, an access database, and a score database. The user database contains personal information about each user of the system such as name, address, etc. The access database contains information about each attempted access such as date, time, identity code, and verification decision. The operator may query the user and the access databases to audit the system usage. The score database is used by the verification control program to set thresholds for acceptance or rejection.

PROGRAM STRUCTURE OF CONTROL SUBSYSTEM

Figure 3:
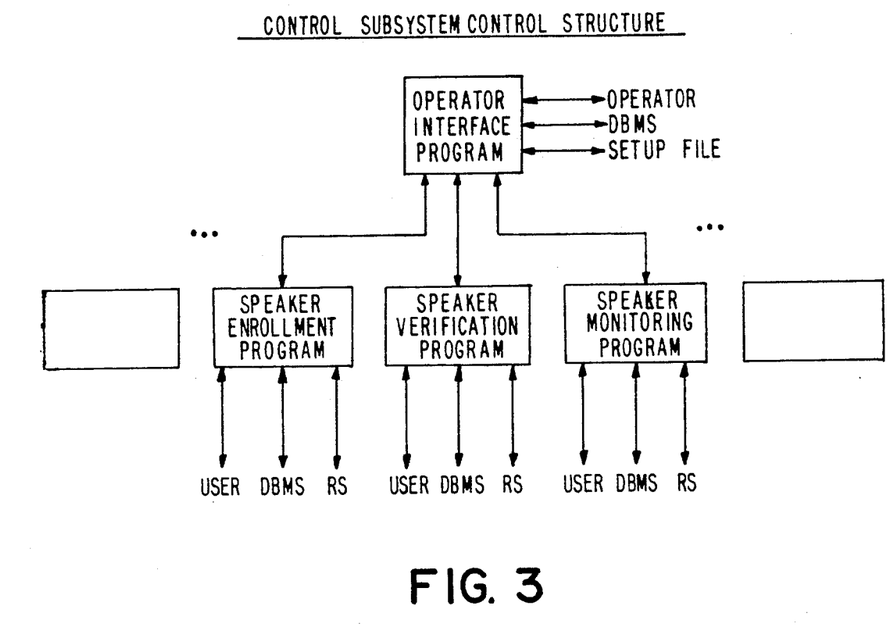
FIG. 3 is a schematic diagram of the structure of the control programs for the control subsystem shown in FIG. 2.

Referring to FIG. 3, the program structure for the control subsystem CS will now be described. The implemented CS embodiment employs the Sun Unix operating system and a set of control programs written in the language C. A separate control program exists for each of the distinct tasks performed by the CS, including speaker enrollment, speaker verification, and speaker monitoring. The function of each control program is to perform the particular task by issuing appropriate internal subsystem operation commands to the RS and to receive and process the results. The control programs also implement the user interface, display instructions, prompt the operator or user, interpret the operator's or user's terminal keyboard input, and store the program's data files (DBMS).

The overall operation of the system is under the control of an operator interface program which allows the operator complete control over the operation of the system. This program is used to select the mode of operation, the input source, system parameters, etc. It creates a "setup" file containing the system parameters and invokes the appropriate control program by opening a new Unix process. Upon startup, the control program reads the setup file. Each control program can also be run using shell scripts without the operator interface program, which facilitates off-line processing of pre-recorded speaker databases. The interface is preferably menu driven to minimize the need for typed input.

A wide range of different operational modes can be setup, tested, and simulated on the described system by selectively loading the appropriate control program or programs from the control program module. The specific function and design of each control program is a matter of choice and need not be described in detail herein. Examples of the operation of speaker enrollment, speaker verification, and speaker monitoring programs are given further below for purposes of illustration. The essential concept in the present invention is the dual configuration of the control and recognition subsystems connected by a common interface wherein a particular control program selected by an operator is loaded by the control subsystem and the real-time speech processing functions of the selected program are executed by the recognition subsystem in response to internal subsystem operation commands generated by the control program. This dual configuration keeps the recognition subsystem accessible to the speaker/user for real-time simulation, while allowing the control subsystem to pursue non-time-critical tasks and maintain flexibility in program range and development.

PROGRAM STRUCTURE OF RECOGNITION SUBSYSTEM

Figure 4:
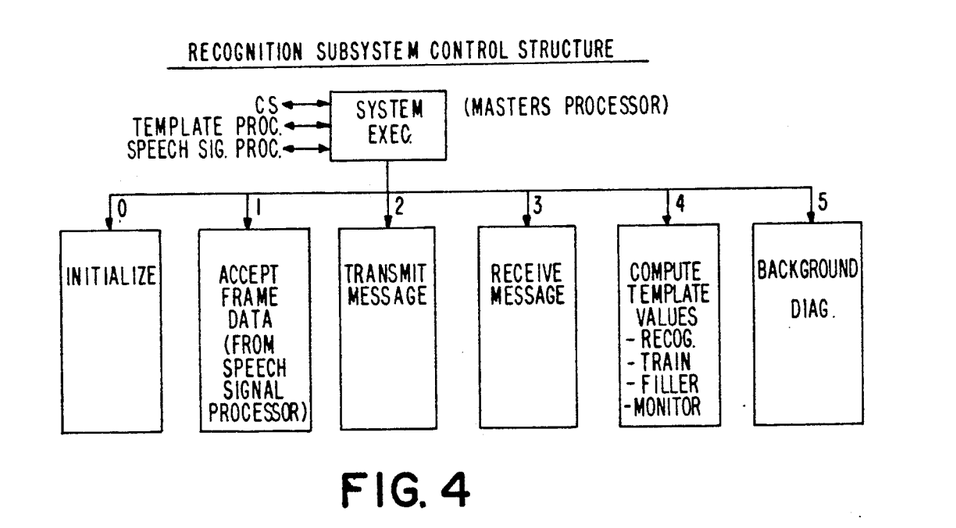
FIG. 4 is a schematic diagram of the control structure of the recognition subsystem shown in FIG. 2.

The master processor of the recognition subsystem RS acts as the subsystem executive to the six template processors and the speech signal processor. As shown in FIG. 4, the master processor software consists of a system executive program and six program modules of different priority levels, labelled 0-5. In order of decreasing priority they are: Initialization; Accept Frame Data; Receive Message; Transmit Message; Compute Template Values; and Background. The Initialization module performs the various tasks for initializing the RS parameters. The Accept Frame Data module coordinates signal acquisition, conditioning, and processing by the speech signal processor into frames of speech data. The Transmit and Receive Message modules coordinate sending response outputs to and receiving command inputs from the CS. The Compute Template Values module performs various speech recognition functions, such as template matching, template training (for enrolling a speaker vocabulary), filler template generation (for silence and other filler templates), and monitoring (for speaker monitoring and verification operational modes). The Background module performs system diagnostics, and is always scheduled.

Template matching is performed by the master processor and the six 68020 template processors. The software for these processors is designed to implement template matching by dynamic programming (DP). The master processor receives a frame of speech data input from the frontend speech signal processor, receives command messages from the CS, and performs the DP algorithm of searching for the closest match among templates downloaded from the CS. The template processors are called once per frame to perform the template difference (distance) computations in parallel, each one processing a preassigned group of templates evenly divided among the template processors.

Tasks to be performed by the RS are requested by sending "inter-module packets" which are placed on a scheduling queue. When a module completes a task and gives up control, the system executive schedules the next priority task by scanning the queue from highest priority to lowest priority. The executive has entry points on the queue to schedule modules both from an interrupt code and from a noninterrupt code. If the priority of a requested task is higher than that of the currently-running task, the executive performs a context switch, giving control to the requested task. The interrupted task is put on the scheduling queue, and the program counter and all registers are preserved so that it can take up where it was interrupted upon regaining control.

Within the RS, each processor may access the memory of all the processors on the common bus. Communication between the master processor and the template processors is performed by means of setting flags in the shared memory. The frontend speech signal processor passes frames of input speech data to the master processor by sending it an interrupt once per frame. The A/D converter passes PCM (pulse code modulated) data to the frontend through a parallel port and generates an interrupt once per sample.

CS/RS INTERFACE

Other than the analog input from the microphone, the only input/output to/from the recognition subsystem RS are the internal subsystem operation commands issued by the CS under a selected control program and the recognition responses provided by the RS through the CS/RS interface. Thus, the command structure to the RS is entirely transparent to the user, and the user can interact with the RS in real-time simulation through the user interface of the CS. The CS/RS interface includes a pair of message buffers, i.e. a transmit buffer for messages from the CS to the RS, and a receive buffer for messages from the RS to the CS. The buffers can be implemented on either side of the VME bus. Sending and receiving messages on the Sun workstation is done by Unix device drivers. The frequency of messages is low enough that there is no difficulty in servicing them.

Messages are exchanged synchronously. The CS/RS interface facilitates asynchronous input and output from and to the control programs running on the CS. The interface maintains the input and output queues in the buffers, and invokes the appropriate message handling routine when a message arrives.

The CS writes directly into the transmit buffer and reads directly from the receive buffer. The CS begins a transmission to the RS by writing a message header and any appropriate data words into the transmit buffer. It then sends an interrupt signal to the RS. A low-level communications (RS receive) module or interrupt processor in the RS recognizes that a message is being sent from the CS and schedules a command interpreter in the RS which fetches the message header, decodes it, fetches the data words (if any), and sends back an acknowledgement (ACK) message to the CS. The RS system executive program then executes the appropriate command modules and logic in the RS to carry out the CS command message.

The RS sends a message to the CS by writing the data words (if any) into the receive buffer along with a message header. The RS then schedules the low-level communications (RS transmit) module to place the message in a location that the CS will access and sends an interrupt request to notify the CS that a new message is available. The CS then sends an interrupt acknowledgement. The RS responds with a status/id, clears the interrupt request, and clears the header and data words from the receive buffer. If appropriate, the CS sends an acknowledgement to the RS upon receipt of the message. Upon receipt of the acknowledgement, the RS terminates the transmission sequence.

In the preferred embodiment of the system having speaker enrollment, verification, and monitoring modes of operation, examples of CS-to-RS messages include: Calibrate Noise; Create Silence Template; Enroll New Template; Train Template (by averaging a repeated utterance with an enrolled template); Recognize Speech; Upload and Download Templates; Download Syntax; Download System Parameters; Filler Generation; and Monitoring Mode. Examples of RS-to-CS messages include: Acknowledgement; Recognition Results; Prompt Speaker; Action Completed; Upload Templates; Upload Noise Calibration; Error messages; and Speaker Verifier Results. The important system functions and internal command sequences of a preferred speech processing development system are described in more detail below.

SYSTEM FUNCTIONS OF SPEAKER VERIFICATION SYSTEM

In one preferred embodiment, a speech processing development system is designed for speaker verification, i.e. for accepting or rejecting the claimed identity of a speaker seeking to enter a controlled area based upon measurements of input speech samples. The verification system includes control programs for enrollment of the speaker's vocabulary (speech samples) in the system, for verification of a speaker's input speech as compared to templates of a previously enrolled vocabulary, and for monitoring a speaker's input without constraint from the system except to authenticate the speaker's identity claim periodically.

The verification system uses a speech recognition algorithm based upon template matching for both text-dependent and text-independent applications. The recognition algorithm is the core of the recognition subsystem. In general terms, the algorithm is of the type which concatenates a sequence of templates and adjusts their time alignment to minimize a measure of dissimilarity between the concatenated templates and the incoming speech. A finite-state syntax is specified to limit the template sequences that the algorithm matches to the incoming speech. Special nodes are declared in the syntax to allow templates corresponding to silence (background noise) or non-speech sounds to be matched at any point in the speech.

The heavy computational loads required by the time-alignment recognition algorithm is handled by the three different types of processors employed in the RS. The frontend speech signal processor implements a signal processing algorithm to obtain suitable frames of speech data having parameter values corresponding to those employed in the stored templates. The template processors perform the recognition computations between the input frames and the resident templates. The master processor interfaces to the first two processor types and controls and directs their overall operation, as well as interfacing to the CS over the VME bus.

Noise Calibration Function. The system calibrates an estimate of the background noise and uses the estimate to create "silence templates". In speech recognition, the RS constantly compares the incoming speech to the silence templates, and determines the of silence or nonspeech if the silence templates match an input signal better than the speaker's vocabulary templates. To calibrate the background noise, the CS sends a Calibrate Noise command to the RS. The RS samples a selected number of frames of an input signal without speech, and generates a noise estimate which is uploaded to the CS.

Create Silence Template Function. Part of the system's syntax definition task involves determining the location and duration for silence templates. The system can be configured to permit the user indefinite pauses in midphrase through the use of a single frame silence template which loops upon itself or pauses of definite duration as modeled in the syntax by one or more silence templates of fixed length at a given node. To create a silence template, the CS gives a Create Silence Template command. This action must be preceded by performing a noise calibration or downloading a stored noise estimate. The CS command contains the template number and the number of frames the silence template will have. Upon receipt of this command, the RS will create the silence template and send an acknowledgement to the CS.

Download Parameters Function. Engineering parameters are selected for variables that can be adjusted to suit the needs of either the acoustical environment or the preference of the system's operator. Usually a value is established for each parameter and left unchanged for the duration of an operation in a given environment. The action is executed by a Download System Parameters command from the CS. Upon receipt, the RS stores the parameters in the master processor and the template processors and sends an acknowledgement message to the CS.

Download Syntax Function. Syntax consists of several distinct blocks of data that together define what speech phrases are considered legal. The blocks of data refer to allowed node-node connectivity and template-node membership structures. Connectivity defines which nodes are allowable extensions of a present node. By connecting nodes to each other, allowable recognition pathways are defined. For any phrase passing through a given node, only those nodes connected to the given node will be active for recognition of the next utterance. Template membership defines which templates reside in each node of a syntax. If a certain node is active, all the templates in its template membership are eligible for matching to the current incoming utterance.

Typically the syntax implemented for speech recognition in a particular application differs from the syntax used to train the vocabulary word templates for that application. During template training, short five or six word phrases tend to create better templates than longer phrases, even though much longer phrases may be allowed or required during speech recognition. Also, only short pauses (less than one second) are allowed between words when training whereas it may be desirable to allow pauses of indefinite length when the system is performing speech recognition.

The action to download syntax is executed by the CS sending a Download Syntax command. The RS stores the syntax in the master processor memory and sends an acknowledgement to the CS.

Download Templates Function. With a syntax loaded in the RS, the speaker's templates can be downloaded to the RS, including silence templates, enrollment filler templates, as well as vocabulary templates. The CS sends a Download Templates command, and the RS stores the templates and sends an acknowledgement. The vocabulary templates are a parametric representation of how a given speaker says each word in the vocabulary. If a template for a vocabulary word already exists in the RS, the RS will replace the old template with the new one being downloaded. Once the system parameters, syntax, and templates have been downloaded, the RS may be commanded into an active mode for speaker enrollment, template training (updating by averaging repeated samples), or speech recognition.

Download Script Function. For the template training procedure, a script file may be used containing a list of specific phrases which will be used as prompts to the speaker during training. The CS sends a Download Script command, and the RS stores the script data and sends an acknowledgement to the CS. If a script is not to be used, the RS can generate legal phrases for prompting during training. The RS creates phrases by following legal paths through the syntax which has been downloaded and selecting those words from each node which require training.

Unload Templates Function. The action to upload all of the resident templates from the RS is executed by the CS by sending an Upload Templates command. The RS responds by sending a series of Upload Templates messages to the CS containing the template data.

Template Training Function. The system allows the user to train a template particular to the user for each word in the active vocabulary. This is accomplished by averaging a new utterance or repeated utterances of each vocabulary word with a template for that word. The training algorithm requires that a set of templates be stored in RS memory so that recognition may be performed as the speaker says each phrase during the training process. Initially, these templates are a set of "seed" templates which are created by the Template Enrollment function (described below). The list of phrases which the user is prompted to say in order to adapt (train) the templates to his voice characteristics is called the training script. The script is either downloaded to the RS or created by the RS.

The CS sends a Train Template command with an identification of the range of templates to be trained. If a script file exists, the RS searches the file for a phrase containing the first vocabulary word to be trained. If a script file is not present, the RS generates a phrase containing the word according to the current syntax. When a valid phrase has been identified, the RS sends the CS a Prompt Speaker message to say the phrase containing the word to be trained.

Figure 5:
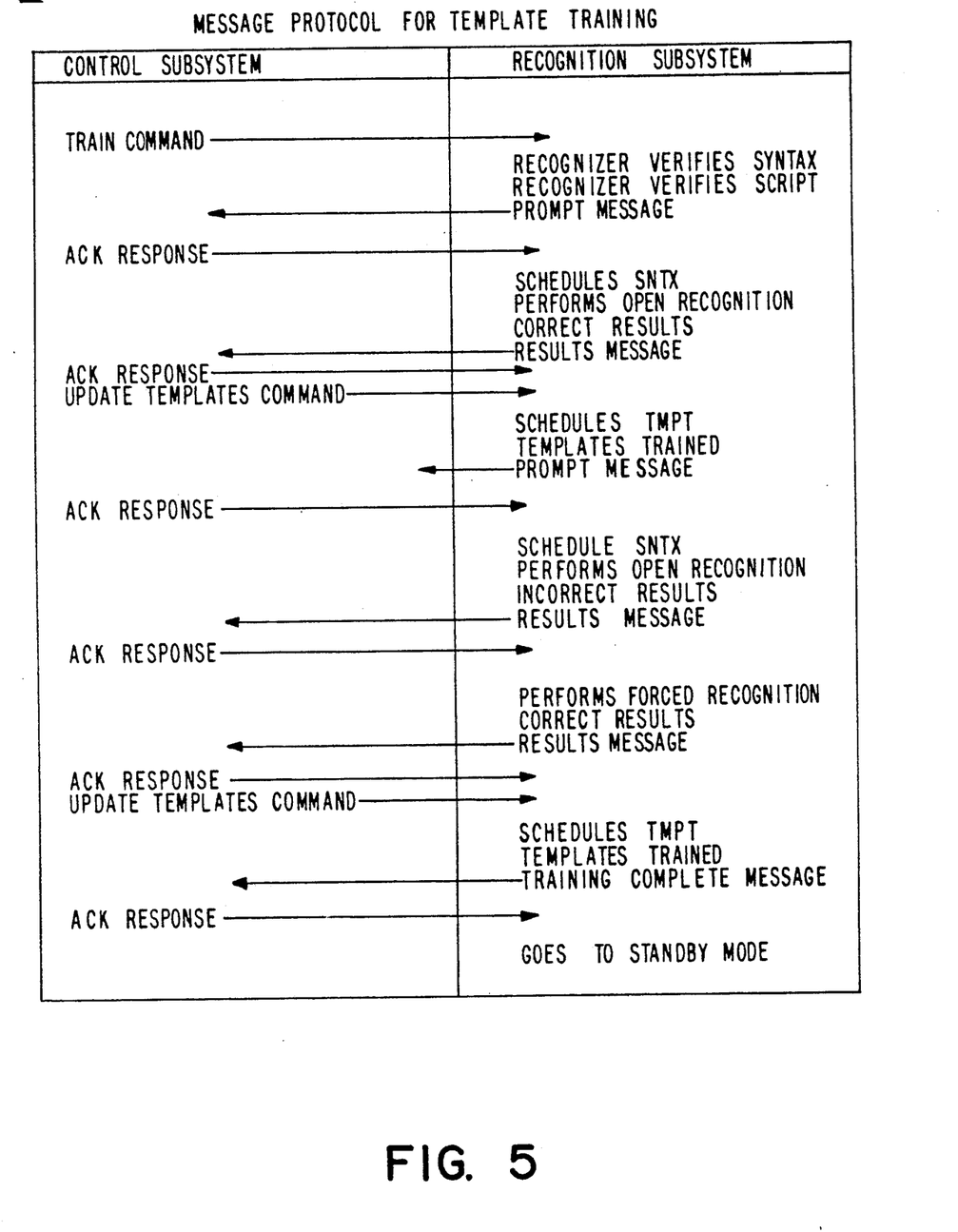
FIG. 5 is a diagram of the communication exchange between the control and recognition subsystems for the template training process.

Once the phrase is spoken, the RS will perform the Recognize Speech function on a one- or two-pass process. The one-pass process is called "open recognition", in which the RS attempts only to determine a match for the word and reports the Recognition Result message to the CS. If the "open recognition" was incorrect, the RS performs "forced recognition" where the speech input is compared to the template for the word which should have been spoken and reports the result to the CS. The CS examines the result of "forced recognition" and determines whether the template should be updated or the phrase repeated. When all of the selected words have been trained, the RS sends a Training Completed message. A diagram of the communication exchange between the CS and RS for the template training process is shown in FIG. 5.

Template Enrollment Function. The purpose of template enrollment is to create the initial template for a vocabulary word by extracting the characteristic values of a speaker's utterance of a word. The RS extracts the utterance values by comparing the input signal to silence templates and enrollment filler templates. Enrollment filler templates are short templates for digits or word syllables. The transition point where the filler templates match the input signal better than the silence templates is marked as the beginning of the word. Similarly, the point where the silence templates return to matching the input signal better than the fillers is marked as the end of the word. The RS converts the data between the beginning and end points into a template for the word and stores the new template. The RS then prompts the speaker for the next word or sends a message that all designated words have been enrolled.

Figure 6:
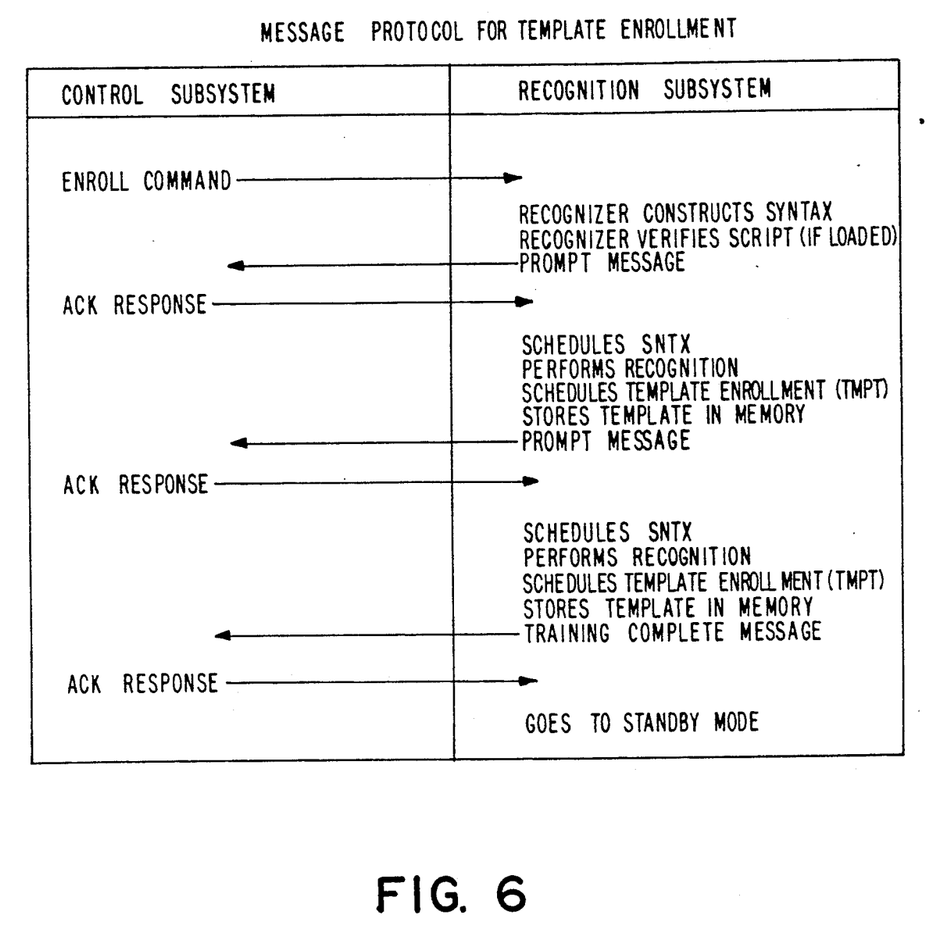
FIG. 6 is a diagram of the communication exchange between the control and recognition subsystems for the template enrollment process.

A diagram of the communication exchange between the CS and RS for the template enrollment process is shown in FIG. 6. For a further description of a novel process for enrolling and training vocabulary templates using filler or seed templates, reference is made to copending U.S. patent application No. 346,054, filed on 5/2/89, by B. P. Landell et al., entitled "Automatic Speech Recognition System Using Seed Templates", now U.S. Pat. No. 4,994,983.

Filler Template Generation Function. This function is used to create a set of filler templates to be used in the Monitoring mode for monitoring text-independent speech. The filler templates are short acoustic segments which do not have any linguistic identity, such as phonemes, diphones, or syllables. The fillers are generated by an algorithm which scans a segment of normal conversation speech, creates templates for filler segments in the speech, averages the segments by iteration to reduce error, then selects the most frequently used filler segments. The templates for the selected filler segments are stored and used later in the Monitoring mode.

This action is executed by the CS sending a Filler Generation command either to process live input from the microphone or digital data from a stored file. The RS responds with a Filler Generation Complete message. At that point, the CS can send the RS an Upload Templates command to save the fillers in storage.

Recognize Speech Function. The speech recognition process is activated by a Recognize Speech command from the CS, and is executed by the RS in three basic steps. The first step is parametric analysis, in which a continuous stream of incoming speech is analyzed into a series of discrete time segments called frames. In the second step the frames are compared with word templates selected in the third step on the previous frame. Each word is represented by a template composed of a sequence of frames like the input speech. The matching process uses the dynamic programming (DP) algorithm to align the frames of the utterance to those of the template, applying non-linear time warping to achieve the best match separately for each template. The results of the matching step are scores for all of the words for which a match is detected. Each score represents the average distance of the parameters of the utterance from the template.

Figure 7:
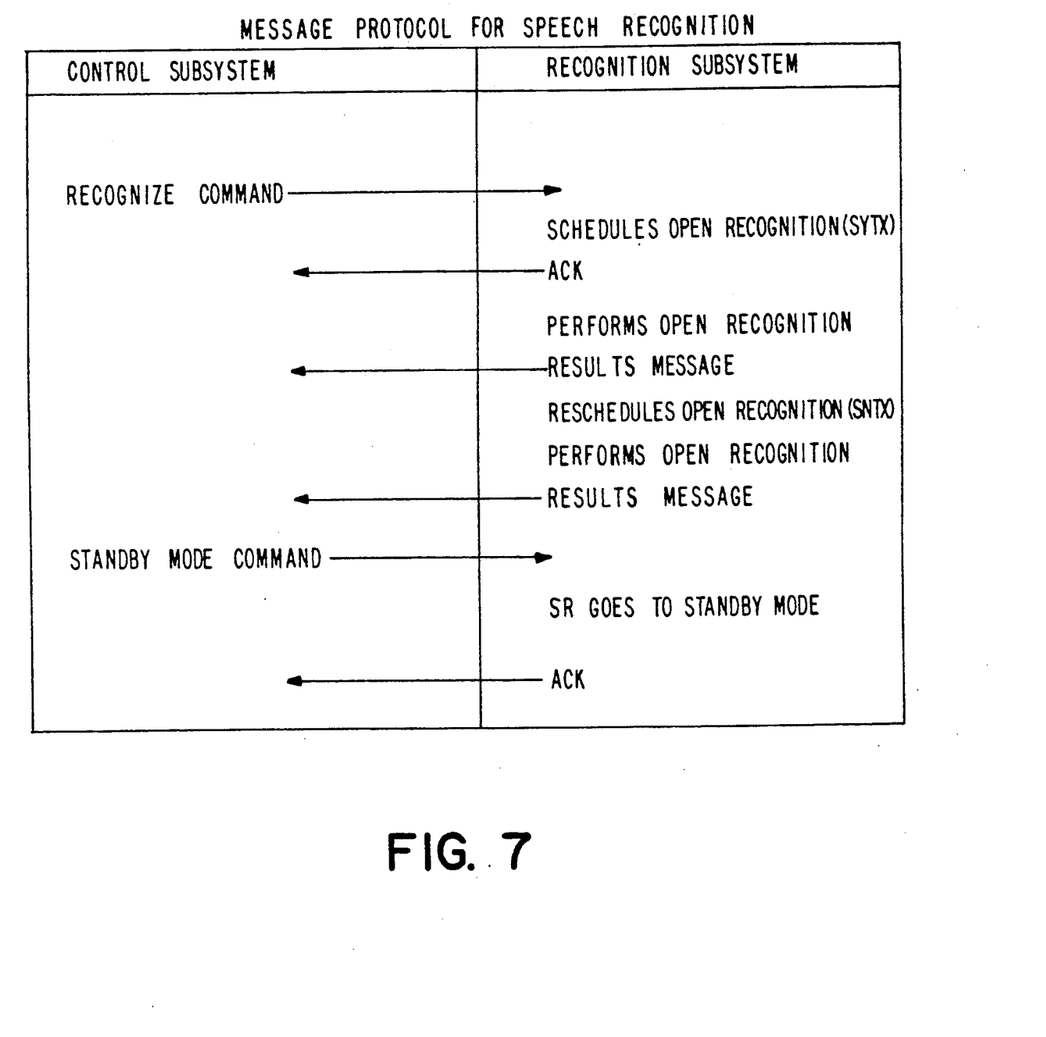
FIG. 7 is a diagram of the communication exchange between the control and recognition subsystems for the speech recognition process

The third step in the recognition process is the syntactic analysis of the word possibilities determined in the matching step by using the predefined syntax structure to narrow down which words can follow any given part of the phrase. The result of this step is a set of best-matching words or partial phrases ending in the current frame, and also determines which words can begin in the next frame. When a complete phrase has been recognized, the RS assembles a Recognition Results message and sends it to the CS. Alternatively, the phrases may be sent in turn when it is determined that new speech will not alter the word or words of the output. A diagram of the communication exchange between the CS and RS for the speech recognition process is shown in FIG. 7.

Monitoring Mode Function. The monitoring mode is activated by a Monitoring Mode command from the CS, and is used to periodically check that the claimed identity of a speaker. Filler (speech particle) templates for the claimed speaker are downloaded to the RS. No syntactic constraint is imposed on the matching process except that each set of speaker filler templates can only concatenate together to best match the incoming speech. Dissimilarity between the speech and the concatenated templates is measured by the speech recognition process in the continuous speech mode. The RS will output a Speaker Verifier Results message periodically to the CS, and the CS uses a scoring algorithm to determine if the speaker input corresponds to the claimed speaker identity.

In summary, the invention provides a development system which can be used as an effective tool for algorithm and application design, and for evaluation of speaker input in real-time simulation of operational environments. The invention employs the dual configuration of the control and recognition subsystems in which the control program selected by the operator is run on the control subsystem and the real-time speech processing functions are executed by the recognition subsystem in response to internal subsystem operation commands generated by the control program. The recognition subsystem is thus accessible to the speaker/user for real-time simulation, while the control subsystem is accessible for non-time-critical tasks. This approach allows the development cycle for system design and/or algorithm improvements to be shortened as compared with the conventional approach of running lengthy simulations on a large computer or on special-purpose hardware prototypes.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

I claim:

1. A real-time speech processing development system comprising:
   (a) a speech recognition subsystem including a master processor, a template matching processor, a speech signal processor, and speech signal input means coupled to said speech signal processor, wherein said master processor is configured to receive internal subsystem operation commands for performing speech recognition and to thereupon generate subsystem execution commands for real-time operation of said speech signal processor to process speech signals received from a user through said speech signal input means into corresponding digital representations, and of said template matching processor to compare the digital representations provided by said speech signal processor with stored templates of word or sound units and to produce a real-time speech recognition output based thereon;

(b) a control subsystem including an operator interface for control communications with a system operator, a user interface for control communications with a user, a control program module, a database storage used by said control subsystem for storing data files for said speech processing development system, and a control processor connected to said operator interface, said user interface, and said control program module, wherein said control processor is configured to receive operator control input through said operator interface and to access said control program module to load one of plurality of control programs selected by the operator, including a speech recognition control program, and wherein said control processor is further configured to operate said user interface, when the speech recognition control program is selected by the operator, for control communications with the user, and to execute said speech recognition control program so as to generate the internal subsystem operation commands for performing speech recognition provided to said master processor of said recognition subsystem; and (c) an interface connected between said control subsystem and said recognition system for transmitting the internal subsystem operation commands for performing speech recognition from said control processor of said control subsystem to said recognition subsystem and the real-time speech recognition output from said recognition subsystem to said user interface of said control subsystem, whereby said control subsystem can be accessed by the operator for non-real-time system development functions while said recognition subsystem can be accessed by the user for real-time speech recognition functions.

wherein said recognition subsystem includes an execution control program executed by said master processor for generating the subsystem execution commands in response to an internal subsystem operation command received from said control subsystem, and wherein said execution control program includes a plurality of execution program modules having different programmed priority levels, and means for assigning subsystem execution commands for tasks to be executed to said modules and for activating said subsystem execution commands according to the priorities of the respective modules.

2. A real-time speech processing development system according to claim 1, wherein said control program module of said control subsystem includes a speaker enrollment program for enrolling vocabulary speech samples of a speaker into said speech processing development system using said speech recognition control program.

3. A real-time speech processing development system according to claim 1, wherein said control program module of said control subsystem includes a speaker verification program for verifying a speaker based upon stored speech samples of the speaker using said speech recognition control program.

4. A real-time speech processing development system according to claim 1, wherein said control program module of said control subsystem includes a speaker monitoring program for passively monitoring the input speech of a claimed speaker as compared to stored speech samples of an identified speaker using said speech recognition control program.

5. A real-time speech processing development system according to claim 1, wherein said recognition system includes a common bus interconnecting said master processor, template matching processor, and speech signal processor.

6. A real-time speech processing development system according to claim 5, wherein said template matching processor includes a plurality of processor units interconnected in parallel with said common bus.

7. A real-time speech processing development system according to claim 1, wherein said interface includes a transmit buffer and a receive buffer for temporarily storing communication exchanges sent or received between said control subsystem and said recognition subsystem.

8. A real-time speech processing development system according to claim 1, wherein said execution control program includes, in order of decreasing priority, a subsystem initialization module, a frame-data acceptance module for receiving a frame of speech data processed by said speech signal processor, a transmit-communications module, a receive-communications module, a compute-template-values module for computationally comparing input frames of speech data with the stored templates, and a subsystem background module.

9. A real-time speech processing development system according to claim 1, wherein said speech signal input means is a microphone input.

10. A real-time speech processing development system according to claim 1, wherein said control subsystem includes said database storage being used for storing system data files, speaker data files, and template data files.

11. A real-time speech processing development system according to claim 10, wherein said control subsystem also executes the speech recognition control program in a non-real-time mode by downloading stored speaker data files as said speech signal input means to said recognition subsystem.

* * * * *